United States Patent [19]

Gutekunst et al.

[11] Patent Number: 4,968,436

[45] Date of Patent: Nov. 6, 1990

[54] METHOD FOR THE TREATMENT OF SEWAGE CONTAINING NITRITES

[75] Inventors: Gerhard Gutekunst, Karlsruhe; Waldemar Mzyk, Calw-Wimberg, both of Fed. Rep. of Germany

[73] Assignee: Wieland Edelmetalle, K.G., Fed. Rep. of Germany

[21] Appl. No.: 344,655

[22] Filed: Apr. 27, 1989

[30] Foreign Application Priority Data

May 2, 1988 [DE] Fed. Rep. of Germany ....... 3814819

[51] Int. Cl.$^5$ .............................................. C02F 1/58
[52] U.S. Cl. .................... 210/743; 210/750; 210/757; 210/903
[58] Field of Search ............... 210/719, 729, 743, 744, 210/750, 757, 631, 903

[56] References Cited

U.S. PATENT DOCUMENTS 3,715,308  2/1973  Sulfaro et al. ............... 210/743
4,280,914  7/1981  Knorre et al. ............... 210/743
4,666,610  5/1987  Kuhns ........................... 210/750 X
4,737,289  4/1988  Castaldi et al. .............. 210/719 X

OTHER PUBLICATIONS

Hartinger, pp. 104–107 and pp. 384–387.

Primary Examiner—Tom Wyse
Attorney, Agent, or Firm—Laff, Whitesel, Conte & Saret

[57] ABSTRACT

In a method for the treatment of sewage containing nitrites comprising the reduction of the nitrite with urea in an acid medium it is provided, to obtain end products friendly to the environment and an economic conduction of the method, that a greatly acid urea solution be supplied and circulated through a pipe reactor, and that the sewage containing nitrite to be treated should be injected into the pipe reactor. Furthermore, the invention relates to a device for carrying out the method and to an examination device which is particularly suitable for the periodic determination of the nitrite content in a circulation duct.

9 Claims, 2 Drawing Sheets

METHOD FOR THE TREATMENT OF SEWAGE CONTAINING NITRITES

FIELD OF THE INVENTION

The invention has for its object a method and a device for the treatment of sewage and concentrates containing nitrites comprising the reduction of the nitrite with urea in an acid medium.

BACKGROUND OF THE INVENTION

As stated in Hartinger's Manual for the Treatment of Sewage (Taschenbuch der Abwasserbehandlung), published by Karl Hanser Verlag (cf. p. 105) nitrite detoxification has so far belonged to the little systematically investigated types of the treatment of sewage. This may well have been due to the fact that the limit value set for introduction into sewage had so far hardly ever been exceeded in practice. With the introduction of new sewage disposal regulations and the stricter limit values connected with this the problem of nitrite detoxification has now come to the fore.

Nitrite is produced in large amounts in hardening, metal cutting and in black annealing of steel parts, etc., when operating with nitric acid on the elutriation of the gases arising during those operations.

In the treatment of sewage containing nitrites recourse is had to oxidation to nitrate and to the reduction to nitrogen.

Oxidative nitrite detoxification may be performed using sodium hypochloride or hydrogen peroxide. An advantage of these reactions consists in that they proceed adequately quickly at pH values around 4. However, these reactions suffer from the drawback that they are harmful to the environment because nitrite is oxidized to nitrate and nitrate pollution of ground water definitely poses problems. In addition, with both reactions, nitrous gases are released on acidification, which are sucked off and have to be subjected to exhaust air purification. Furthermore, with these two methods, acidification has to be performed first, followed by further neutralization. The advantage of reaction with sodium hypochloride lies in that it can be performed by redox potential measurement, and sodium hypochloride is relatively costly. However, the action is not selective, i.e. all oxidizable constituents are also oxidized in the process. In this connection, especially, chlorinatable organic compounds are chlorinated, as free chlorine is available. In addition, chlorine gas is emitted so that gas washers are necessary. Also, there is an undesirable strong salination of the sewage.

Hydrogen peroxide, for its part, is again relatively expensive and excess of hydrogen peroxide causes problems during the subsequent treatment steps. Thus, in this reaction, chromium, if it is present, is oxidized to chromate and must accordingly be reduced again. Already traces of various impurities may lead to catalytic decomposition of hydrogen peroxide and cause pronounced gas production.

As opposed to the above, reductive detoxification of nitrites has the advantage that no nitrate injurious to the environment, but nitrogen, is produced.

When using amidosulphonic acid a very rapid and selective reaction is achieved from pH values below 4. To avoid too strong a production of nitrous gases and thus gas washing the pH value must, however, be controlled as acid is released. The drawback with using amidosulphonic acid is that it is expensive, salination has to be performed and a sulphate problem thus arises, so that in practice it is not possible to keep to the sulphate limit values. In addition, additional costs arise for the neutralization of the acid released. Moreover, it is not possible to conduct the reaction via redox potential measuring.

Nitrite detoxification by reduction with the aid of urea has long been known per se and is also described in Hartinger, page 107. In the usual modus operandi, however, this reduction at pH values above 3, at which it is still possible to operate without too great a production of nitrous gases. It is pointed out in Hartinger that at normal temperature reaction begins to take place at below pH=3.

SUMMARY OF THE INVENTION

Taking the foregoing as a basis, the invention has for its object to provide a method and a device by means of which, while retaining the basic advantages of a nitrite detoxification by reduction an effective, rapid, environment-friendly and particularly cost-advantageous nitrite detoxification is made possible.

This object is achieved by means of a method which is characterized in that a strongly acid urea solution is prepared and circulated through a tube reactor, and in that the nitrite-containing sewage to be treated is injected into the tube reactor.

It is indeed true that as a result of the very acid medium nitrous gases arise intermediarily which, however, cannot escape the tube reactor provided according to the invention and are forced to take part in further reaction, so that in the end only the nitrogen and carbon dioxide gases leave the tube reactor and escape through the urea solution. Accordingly no toxic gases of any kind arise and a costly gas washing can be dispensed with. A salination of the solution is avoided and indeed a desalination is even achieved. The urea put into work is very cheap and is environment-friendly. The reaction is further accelerated by the reaction heat. If it is possible in this manner to set temperatures above 40° C., an ammonium detoxification of up to 50 mg/l is also possible.

A further advantage of the method of the invention in relation to security of performance as compared with the above-mentioned method lies in that, by means of an examination apparatus according to the invention any overdose of reaction partners causing dangerous reactions is ruled out.

Preferably the pH of the urea solution is below 2. The adjustment of this pH can be effected advantageously in controlled manner with recovered acid via a pH electrode. Recovered acid is obtained in many plants in which sewage containing nitrites is also produced. As this recovered acid is used in the reaction, there is achieved through the procedure according to the invention the additional advantage of the neutralization of this recovered acid.

Advantageously, it is further provided that the nitrite content of the circulated medium is measured and depending on this the urea dosage into the reaction medium is controlled, and particularly so that the urea dosage is effected substantially proportionally to the measured nitrite concentration.

Measuring nitrite content is by taking a test amount e.g. via a branch duct as watching the urea reaction by means of redox potential measurements is not possible. Just the same, by means of the procedure of the invention an automatic control of the method is made possible.

Advantageously, it is provided for the determination of the nitrite content that a specific test volume of the medium to be investigated is dosed into a sampling container, then a reagent reacting with the nitrite with production of gas is added, and that, subsequently, a determination of the alteration in level is made via an overflow duct, this alteration being caused by gas production and forcing the liquid over.

The measurement principle thus consists in that the production of gas and the forcing over of liquid resulting therefrom are used as an indicator of whether and which amount of nitrite is still present. To achieve fully automatic operation it is preferably provided that the sampling container should be included in a branch duct of the circulation duct, that to carry out a measurement the flow supplied should be interrupted and the reagent dosed, and that after a measurement flowing in should be resumed.

In this manner it is ensured that fresh medium is constantly present in the sampling container, reflecting the state of affairs in the sampling container.

Advantageously, the opening and closing of the supply into the sampling container should be periodically controlled by an automatic switch. In this manner no continuous supervision, it is true, is effected as with a redox potential measurement, but just the same an almost continuous measurement is obtained with accuracy sufficient for this particular case of application.

The invention relates also to a device, in particular for carrying out the method of the invention, which is characterized by a treatment container, a supply container for urea with a metering duct leading into the treatment container, a supply container for acid with a metering duct leading into the treatment container, a circulation duct, leading out of and into the treatment container, with a circulation pump, a tube reactor extending in the treatment container, into which the circulation duct opens out, a supply container for the sewage containing nitrite and a metering duct opening out from this into the upstream end of the tube reactor.

In the tube reactor according to the invention there takes place the reduction of the nitrite with the aid of the urea, and when this takes place—as already described above—the nitrous gases first produced react further in the tube reactor, so that at the end of the tube reactor there flow out only the nitrogen and carbon dioxide gases which cause no problem. In the arrangement of the invention, moreover, the reaction heat developing in the tube reactor is transmitted to the liquid present in the treatment container, so that this is preheated and in this manner it can be achieved that reaction temperatures of over 40° C. can be set in the tube reactor without special external supply of heat.

In a further embodiment of the invention it is provided that an examination device is mounted in a branch duct of the metering duct. In this manner it is possible to have a continuous determination of the nitrite content for the automatic control of the dosage of added urea.

The invention is also directed at an examination device for the electrical detection of the presence of a chemical component in a liquid. This examination device is in particular also suitable for the determination of the presence of nitrite in sewage in connection with the method described above and the corresponding device.

The examination device is characterized by a sampling container with devices for detecting alterations of liquid level and by a metering duct opening out into the sampling container for a reagent producing a gaseous reaction product with the component to be detected. If the component to be detected is present in the liquid, liquid is displaced by the gas produced and thereby the liquid level is altered, said alteration of level being converted into a modification of electric circuit state and thereby into an electric control signal.

A particularly favourable instance of application consists in that the examination device is inserted into a duct through which the liquid to be examined passes, and provision is made for a device for interrupting the flow into the sampling container during the measuring process. In this way a particularly elegant solution is given to the problem of constantly maintaining a sampling volume reflecting the actual state of the liquid and thus, with a short interruption of flow, being able to carry out measurements almost continuously. The device for the interruption of the flow consists advantageously in a magnetic valve periodically controlled by a timer element.

The device for the detection of liquid level can cover all the usual level gauges which allow the setting of a preselectable threshold value.

Further advantages and features of the invention will become apparent from the ensuing description of a preferred embodiment taken in conjunction with the drawing.

DESCRIPTION OF THE PREFERRED EMBODIMENT

Figure 1:
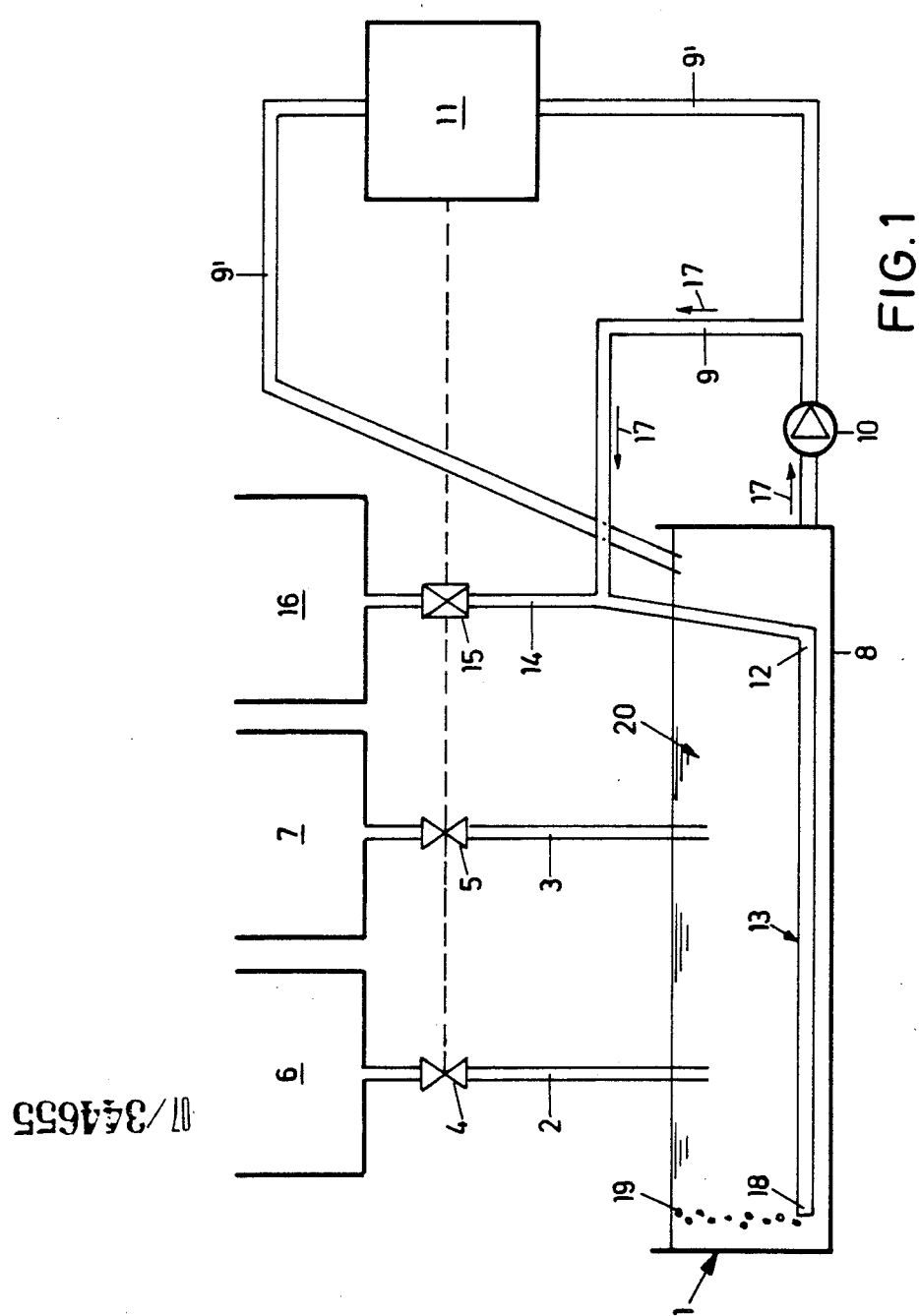
FIG. 1 is a diagrammatic block representation of a device according to the invention and FIG. 2 is a diagrammatic section through an examination device according to the invention.

A device diagrammatically represented in FIG. 1 comprises a treatment container 1 into which metering ducts 2, 3 open out, having respectively one metering valve 4, 5, connected with a supply container 6 for urea and a supply container 7 for acid, preferably any recoverd acid that may be available.

A circulation duct 9 with a circulating pump 10 branches off the bottom 8 of the container 1. This duct 9 leads back to the container 1 and opens out there into the upstream end 12 of a tubular reactor 13. In this upstream end 12 of the tube reactor 13 or of the circulation duct 9 there also opens out a metering duct 14 with a metering device 15 coming from a container 16 for the sewage containing nitrite to be treated.

The device of FIG. 1 described in the example of embodiment operates in such a manner that in container 1 urea from container 6, acidified with recovered acid from container 7, is made available with a pH set below 2. By means of the circulating pump 10 and via the circulation duct 9 the acidified urea solution is pumped in the direction of the arrows 17, sewage containing nitrites to be treated, originating from container 16, being metered at the upstream end 12 of the tube reactor 13. The reduction reaction takes place in the reactor 13, nitrous gases arising intermediarily and reacting further along the tube reactor 13 so that at the end of the tube reactor 13 — as shown at 19 — nitrogen and carbondioxide flow out.

Figure 2:
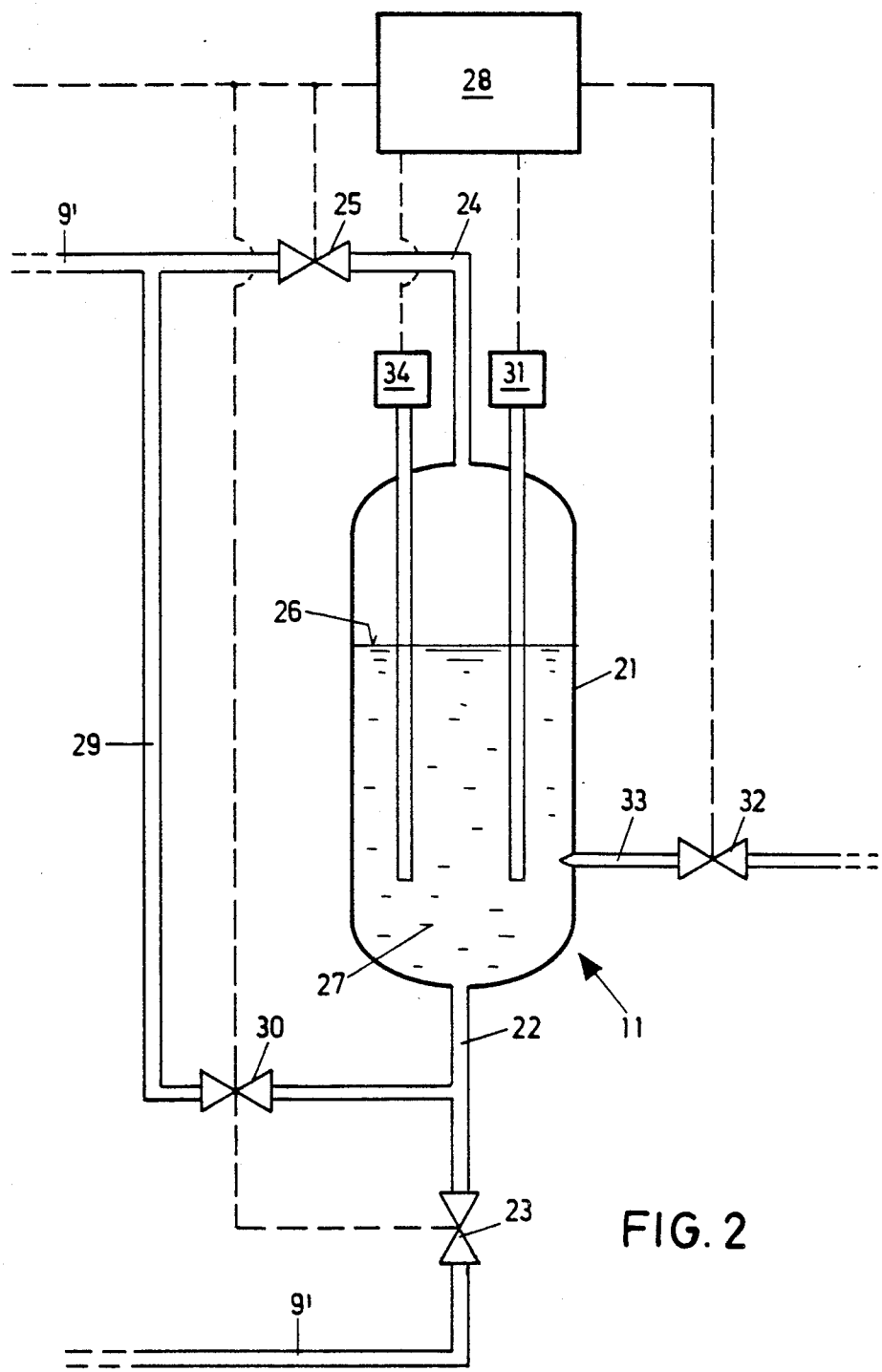

During the entire period of treatment of the charge 20 situated in the container 1 a check is made as to whether it still contains nitrite and whether the pH is still properly set and whether, correspondingly, the addition of urea from container 6 or acid from container 7 is still necessary. Supervision is effected by means of an examination device 11 which is shown in detail in FIG. 2.

The examination device 11 comprises a sampling container 21 into which a feed pipe 22 of the branch duct 9' of the circulation duct 9 opens out, downstream from a magnetic valve 23.

The outlet 24 leads via a magnetic valve 25 and the branch duct 9' back into the container 1. Accordingly there is always in the sampling container 21 a definite volume of liquid to be checked.

To carry out a measurement for checking whether the charge 20 still contains nitrite, the magnetic valve 23 is closed at periodical time intervals from a central control unit 28 so that the liquid volume of the sampling container remains in the sampling container 21.

At the same time a magnetic valve 25 of the outflow duct 24 is closed from the central control unit 28 and the magnetic valve 30 of the overflow duct 29 is opened. Subsequently, a metering valve 32 in a metering duct 33 is opened, and a reagent reacting with nitrite with production of gas is supplied in a metered amount.

If the sampling solution still contains nitrite, there is produced during the very fast reaction now starting, depending on the concentration of the nitrite still remaining, an amount of gas which displaces the liquid 27 over the overflow duct 29 so that the liquid level 26 drops, and is recorded at the level gauge 31. If the level of liquid 26 does not reach the threshold value set at the level gauge 31, the level gauge 31 emits a signal to the central control unit 28 which releases, by actuating the metering valve 4, the further addition of urea from container 6.

After the completion of a measuring process as described above, the central control device 28 institutes the closure of the valve 30 of the overflow duct 29 and the opening of the magnetic valves 23 and 25 of the inlet and outlet, so that the sampling container 21 is again swept through with reaction medium coming from the branch duct 9' of the circulation duct 9.

By means of the central control device 28, after a charge has been fully worked off, it is also possible to blow off the entire charge 20 through a blow-off duct not illustrated or represented in detail, and to control the fresh supply of urea and acid.

In a preferred embodiment the pipe reactor 13 has, e.g., a length of 20 meters for a diameter of 6.3 cm.

By means of the circulating pump 10 about 7000 liters of the charge present in the container 1 are circulated in one hour. With a container volume of 2 m$^3$ of container 1 the detoxification of a charge 20 takes about 6 hours. At the same time, in the operation, about 1000 liters of recovered acid are neutralized, so that the amount of sodium lye which would otherwise be required for this purpose is saved.

Instead of the above-described process using individual charges, it is also possible in principle to conduct the process of the invention in continuous manner. The end products arising are then supplied to through flow neutralization.

If — as, for example, in separation plants — the recovered acid still contains ammonium, there occurs furthermore an incidental reaction between ammonium and nitrite, in the course of which nitrogen is produced, contributing to the detoxification of the nitrite.

What is claimed is:

1. A method of treatment of sewage containing nitrates comprising the reduction of the nitrate with urea in an acid medium, wherein a urea solution is supplied and circulated through a tube reactor, and wherein the sewage containing nitrities is injected into the tube reactor, and wherein the pH of the urea solution is below 2.

2. A method according to claim 1, wherein the urea solution is acidified with recovered acid.

3. A method according to claim 1, wherein the urea solution is acidified with recovered acid charged with heavy metal ions.

4. A method according to claim 1, wherein the pH of the circulated medium is continuously measured and, depending upon this, the dosage of acid into the reaction medium is controlled.

5. A method according to claim 1, wherein the nitrite content of the circulated medium is measured and, depending upon this, the dosage of urea into the reaction medium is controlled.

6. A method according to claim 5, wherein the urea dosage is substantially proportional to the nitrite concentration measured.

7. A method according to claim 5, wherein for the determination of the nitrite content a specific sampling volume of the medium to be examined is dosed in a sampling container, wherein the level of the medium is detected in the container, wherein a reagent reacting with the nitrite with production of gas is then supplied in a metered amount, and wherein subsequently the change of level seen at an overflow duct is detected and as a result a control signal is produced.

8. A method according to claim 7, wherein the sampling container is inserted in a branch duct of the circulation duct and the sampling container is constantly filled with the reaction medium, and wherein, for performing a measurement, the inflow and outflow are interrupted, the overflow duct is opened and the reagent is dosed in, and wherein after the measurement the overflow duct is again closed and the inflow and outflow are opened.

9. A method according to claim 8, wherein measurement is controlled at periodical intervals by a switching element.

* * * * *

UNITED STATES PATENT AND TRADEMARK OFFICE
CERTIFICATE OF CORRECTION

PATENT NO.  : 4,968,436

DATED       : November 6, 1990

INVENTOR(S) : Gerhard Gutekunst, Waldemar Mzyk and assigned to Wieland Edelmetalle It is certified that error appears in the above-identified patent and that said Letters Patent is hereby corrected as shown below:

In column 1, lines 43 and 44, change "hypochloride" to --hyochlorite--.

In the claims: claim 1, lines 14 to 15, change "nitrates" to --nitrites--;

claim 1, line 18, change "nitrities" to --nitrites--.

Signed and Sealed this

Fourteenth Day of July, 1992

Attest:

DOUGLAS B. COMER

*Attesting Officer*          *Acting Commissioner of Patents and Trademarks*